United States Patent
Hockett et al.

(10) Patent No.: US 9,282,852 B2
(45) Date of Patent: Mar. 15, 2016

(54) CONVEYOR-BASED FRYING APPARATUS AND METHODS OF USE

(71) Applicant: ConAgra Foods Lamb Weston, Inc., Omaha, NE (US)

(72) Inventors: William T. Hockett, Kennewick, WA (US); Frederick D. Webb, Hermiston, OR (US); Brian J. Pikl, Aumsville, OR (US); Christopher M. Imdieke, Molalla, OR (US)

(73) Assignee: ConAgra Foods Lamb Weston, Inc., Omaha, NE (US)

( * ) Notice: Subject to any disclaimer, the term of this patent is extended or adjusted under 35 U.S.C. 154(b) by 0 days.

(21) Appl. No.: 14/483,559

(22) Filed: Sep. 11, 2014

(65) Prior Publication Data

US 2014/0373730 A1 Dec. 25, 2014

Related U.S. Application Data

(63) Continuation of application No. 12/886,423, filed on Sep. 20, 2010, now abandoned.

(51) Int. Cl.
*A47J 37/12* (2006.01)
*A23L 1/01* (2006.01)

(52) U.S. Cl.
CPC .......... *A47J 37/1214* (2013.01); *A23L 1/0107* (2013.01)

(58) Field of Classification Search
CPC . A23L 1/0107; A47J 37/1214; A47J 37/0704
USPC ...................... 198/347.1, 848, 837, 841, 852; 99/403–407, 443 C, 443 R
See application file for complete search history.

(56) References Cited

U.S. PATENT DOCUMENTS

| | | | |
|---|---|---|---|
| 2,833,203 A | 5/1958 | Benson et al. |
| 3,353,962 A | 11/1967 | Smith, Jr. |
| 3,641,924 A | 2/1972 | Sijbring |
| 3,869,971 A | 3/1975 | Driscoll |
| 4,078,398 A | 3/1978 | Cloudy |

(Continued)

FOREIGN PATENT DOCUMENTS

| | | |
|---|---|---|
| EP | 0735325 | 10/1996 |
| GB | 1519049 | 7/1978 |

(Continued)

OTHER PUBLICATIONS

International Search Report mailed Feb. 13, 2012, in U.S. Appl. No. PCT/US2011/051969.

(Continued)

*Primary Examiner* — Dana Ross
*Assistant Examiner* — James Sims, III
(74) *Attorney, Agent, or Firm* — Ryan T. Grace; Advent, LLP

(57) ABSTRACT

A fryer can include a base having a reservoir for receiving oil for frying a food product and a hood coupled to the base. The fryer can have an inlet at an upstream section and an outlet at a downstream section. At least one conveyor can move food product from the inlet to the outlet. A first baffle member and second baffle member can be positioned over the conveyor to define a frying chamber therebetween. The first and second baffle members can restrict air from flowing into the frying chamber from outside of the frying chamber.

18 Claims, 10 Drawing Sheets

(56) References Cited

U.S. PATENT DOCUMENTS

| | | | |
|---|---|---|---|
| 4,325,295 A * | 4/1982 | Caridis et al. | 99/339 |
| 4,366,749 A | 1/1983 | Caridis et al. | |
| 4,397,299 A | 8/1983 | Taylor et al. | |
| 4,478,140 A | 10/1984 | Bullock | |
| 4,488,478 A | 12/1984 | Leeper | |
| 4,589,264 A | 5/1986 | Astrom | |
| 4,658,709 A | 4/1987 | Anderson | |
| 4,852,475 A | 8/1989 | Yang | |
| 4,951,807 A | 8/1990 | Roinestad et al. | |
| 4,953,693 A | 9/1990 | Draebel | |
| 5,066,505 A | 11/1991 | Vos et al. | |
| 5,182,982 A | 2/1993 | Hattori et al. | |
| 5,454,296 A | 10/1995 | Beardsley et al. | |
| 5,460,262 A | 10/1995 | Kennedy et al. | |
| 5,580,598 A | 12/1996 | Benson et al. | |
| 5,947,010 A | 9/1999 | Barry et al. | |
| 6,067,899 A | 5/2000 | Caridis et al. | |
| 6,468,573 B1 | 10/2002 | Herrick et al. | |
| 6,783,685 B2 | 8/2004 | Hwang | |
| 6,796,142 B2 | 9/2004 | Burn | |
| 7,121,107 B2 | 10/2006 | Ishikura et al. | |
| 2003/0004348 A1 | 1/2003 | Sonoda et al. | |
| 2004/0049923 A1 | 3/2004 | Smith et al. | |
| 2005/0109009 A1 | 5/2005 | Muller et al. | |
| 2005/0132899 A1 | 6/2005 | Huang et al. | |
| 2005/0181102 A1 | 8/2005 | Basker et al. | |
| 2009/0175988 A1 * | 7/2009 | Khanania | 426/236 |
| 2010/0021602 A1 * | 1/2010 | Caridis et al. | 426/438 |
| 2010/0112177 A1 | 5/2010 | Bourg et al. | |

FOREIGN PATENT DOCUMENTS

| | | |
|---|---|---|
| WO | 9312703 | 7/1993 |
| WO | 0056194 | 9/2000 |

OTHER PUBLICATIONS

Supplementary Partial European Search Report dated Feb. 2, 2015 (App. No. 118271265.7).

* cited by examiner

CONVEYOR-BASED FRYING APPARATUS AND METHODS OF USE

FIELD

This disclosure is directed to novel frying apparatuses and methods of frying food products, such as sweet potato or other potato products.

BACKGROUND

Conventional belt frying systems for food products, such as french fries or other potato products are well known. However, such conventional systems suffer from many drawbacks which reduce the efficiency of the system. For example, in many conventional belt frying systems, a large amount of energy is required to heat the frying oil in the system; however, the frying systems are not well-contained and therefore, much of this energy is quickly lost to the atmosphere in the form of steam. Also, many conventional belt frying systems are difficult to clean and have structures that collect crumbs or other debris, thereby degrading oil quality and, in some cases, creating potential fire hazards.

SUMMARY

In a first embodiment, a fryer includes a base, a hood, and at least one conveyor. The base can have a reservoir for receiving oil for frying a food product. The hood can be coupled to the base and have an inlet at an upstream section and an outlet at a downstream section. The conveyor can move food products from the inlet to the outlet. To provide a substantially air-tight frying chamber, a first baffle member can be positioned over the at least one conveyor and a second baffle member can be positioned over the at least one conveyor downstream of the first baffle member. The first and second baffle members can thereby define a frying chamber and the first and second baffle members can restrict air from flowing into the frying chamber from outside of the frying chamber to improve the efficiency of the fryer.

In some implementations, the first and second baffle members can extend downward from a top portion of the hood and extend across the width of the hood to substantially restrict air from flowing into the frying chamber. In other implementations, the first and second baffle members can extend downward so that a lower portion of the first and second baffle members is adjacent to a top surface of the at least one conveyor. The first and second baffle members can be vertically movable to adjust a distance between the lower surface of the first and second baffles and the top surface of the at least one conveyor.

In some implementations, systems and methods for recapturing energy, such as steam, are provided. The hood can include a steam recapture port positioned between the first and second baffle members. The hood can also include at least one exhaust port positioned outside of the frying chamber in the vicinity of at least one of the first and second baffle members. The exhaust port can restrict air outside of the frying chamber from entering the frying chamber, thereby improving the efficiency of the frying chamber. In some implementations, the frying chamber can include a first frying section and a second frying section separated from the first frying section by a wall member. In other implementations, the conveyor can have a first conveyor member that moves the food product through the first frying section and a second conveyor member that moves the food product through the second frying section. The first conveyor member can have an inclined section to raise the food product over the wall member to deliver it to the second frying section.

In some implementations, the conveyor can include a plurality of side links coupled together via rod members that extend across the width of the conveyor. The conveyor can also comprise a plurality of slidable members positioned between the side links. A channel extending along at least a portion of the base can be configured to receive the plurality of slidable members of the conveyor.

In another embodiment, a conveyor system for a fryer can be provided. The conveyor can include a base that has a reservoir for receiving oil for frying a food product. A top and bottom channel can be provided in the base. A conveyor for moving food product from an upstream area of the fryer to a downstream area of the fryer can comprise a plurality of side links coupled together via rod members that extend across the width of the conveyor. A plurality of slidable members can extend at least partially into the top and bottom channels in the base. Each slidable member can be configured to receive at least a portion of one side link to retain the conveyor in the top and bottom channels and restrict contact of the side links with the base.

In some implementations, the slidable member comprises a polyether ether ketone. The slidable member can be generally the same width as a depth of the top and bottom channels. Each slidable member can comprise a recessed portion on an inside face for receiving a portion of the side link that extends outward towards the top and bottom channels, and each slidable member can comprise a recessed portion on an outside face to receive a retainer for securing the rod member to the slidable member.

In some implementations, each side link comprises a first rod receiving section and a second rod receiving section. The first rod receiving section can include a generally cylindrical member that has an opening extending therethrough and the second rod receiving section can include a pair of spaced apart openings. A cylindrical member of a first side link is configured to be received between the pair of spaced apart openings of a second side link and a rod member can be inserted through the opening in the cylindrical member of the first side link and the pair of spaced apart openings in the second side link to couple the first and second side links together.

In another embodiment, a method of frying food products is provided. The method includes delivering a food product onto a conveyor and into a flyer comprising a base and a hood; conveying the food product under a first baffle member and into a substantially enclosed flying chamber; and conveying the food product under a second baffle member and out of the flying chamber. The flying chamber can comprise a reservoir of heated oil for at least partially frying the food product. The frying chamber can be located between the first and second baffle member. In some implementations, steam generated in the frying chamber can be captured at a steam recapture port. In other implementations, air can be exhausted through a first opening in the hood upstream of the first baffle member and through a second opening in the hood downstream of the second baffle member. The exhausting of air through the first and second openings can restrict the air from outside the frying chamber from flowing into the frying chamber. In some implementations, a distance of a lower surface of the first or second baffle member from the conveyor can be adjusted by raising or lowering the first or second baffle member.

In certain implementations, the conveyor comprises a plurality of side links, rod members, and slidable members. The act of conveying the food product can include providing a pair of recessed channels in the base of the fryer; coupling the side links to one another via the rod members, the rod members extending across the width of the flyer; positioning the slidable members between the side links and the recessed channels; and moving the conveyor so that only the slidable members contact the recessed channels.

The foregoing and other objects, features, and advantages of the disclosed embodiments will become more apparent from the following detailed description, which proceeds with reference to the accompanying figures.

DETAILED DESCRIPTION

The following description is exemplary in nature and is not intended to limit the scope, applicability, or configuration of the invention in any way. Various changes to the described embodiment may be made in the function and arrangement of the elements described herein without departing from the scope of the invention.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

Although the operations of exemplary embodiments of the disclosed method may be described in a particular, sequential order for convenient presentation, it should be understood that disclosed embodiments can encompass an order of operations other than the particular, sequential order disclosed. For example, operations described sequentially may in some cases be rearranged or performed concurrently. Further, descriptions and disclosures provided in association with one particular embodiment are not limited to that embodiment, and may be applied to any embodiment disclosed.

Moreover, for the sake of simplicity, the attached figures may not show the various ways (readily discernable, based on this disclosure, by one of ordinary skill in the art) in which the disclosed system, method, and apparatus can be used in combination with other systems, methods, and apparatuses. Additionally, the description sometimes uses terms such as "produce" and "provide" to describe the disclosed method. These terms are high-level abstractions of the actual operations that can be performed. The actual operations that correspond to these terms can vary depending on the particular implementation and are, based on this disclosure, readily discernible by one of ordinary skill in the art.

Figure 1:
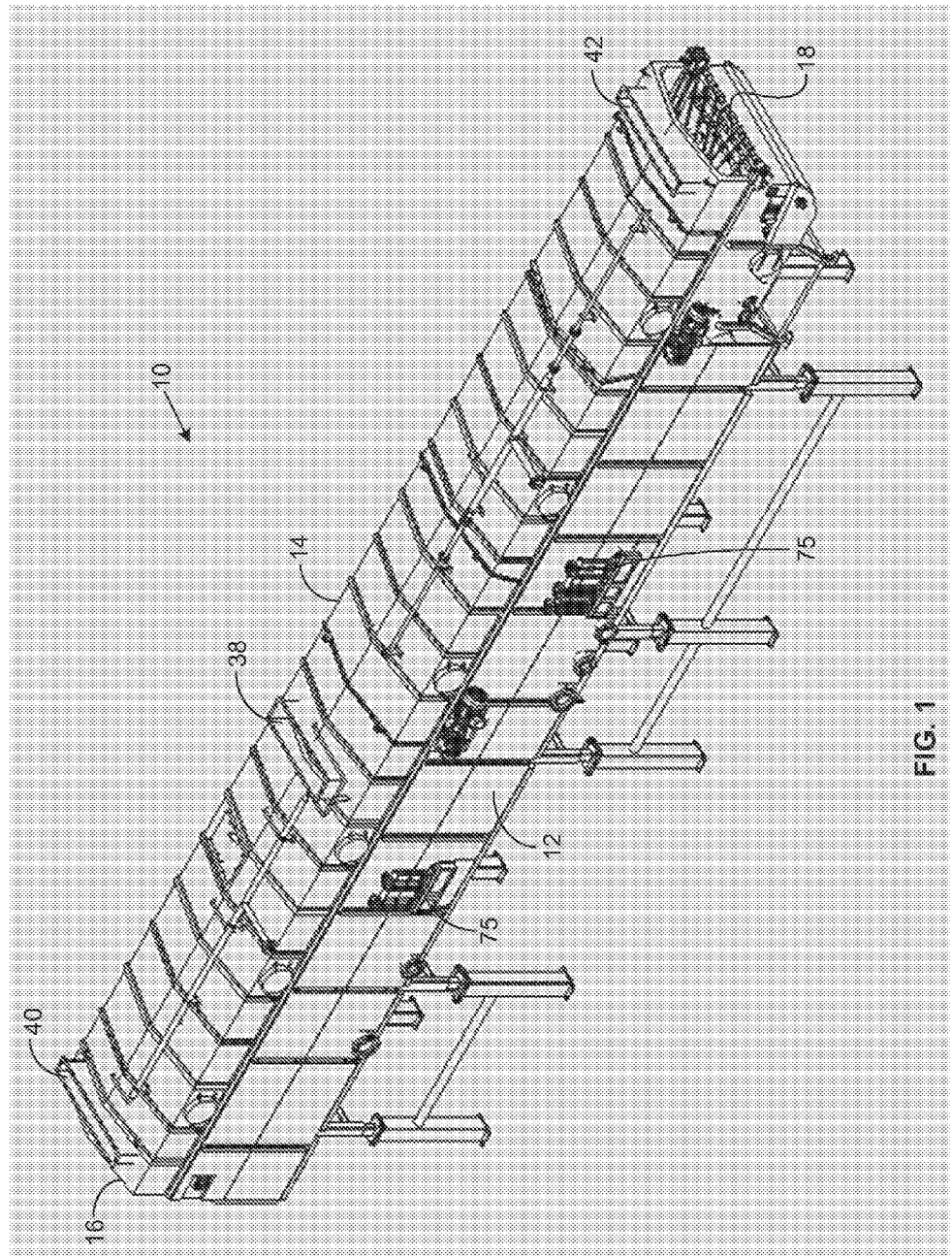
FIG. 1 is a perspective view of a novel fryer.

FIG. 1 illustrates a perspective view of a novel fryer 10. Fryer 10 comprises a base 12 and a hood 14. Base 12 has one or more oil receiving areas and one or more conveyor belts configured to transport product (e.g., a food article) from a first end 16 (inlet) to a second end 18 (outlet). Hood 14 can be coupled to base 12 in a substantially air-tight manner. Conventional fryer hoods are generally "liftable" for removing or raising the hood for cleaning of the interior of the fryer. Hood 14, however, is preferably generally fixed (i.e., non-liftable) to base 12. By fixing hood 14 to base 12 in a secured, non-liftable manner, it is possible to achieve a more efficient seal between the two elements, which can further improve the efficiency of a frying chamber (as discussed below) of the fryer.

Figure 2:
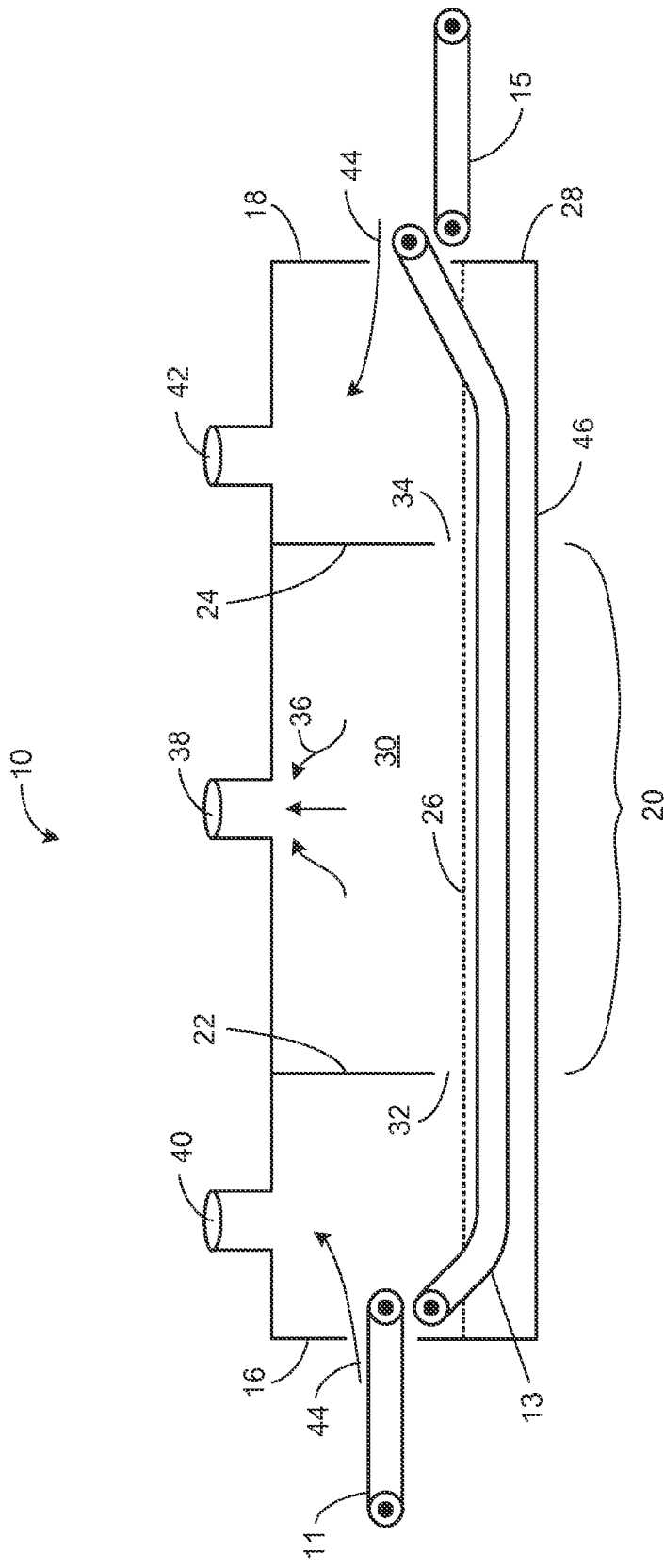
FIG. 2 is a schematic cross-sectional view of a novel frying system.

FIG. 2 illustrates a schematic cross-sectional view of fryer 10. Fryer 10 can comprise one or more frying areas 20 that contain oil 26 within an oil receiving area 28. An infeed conveyor 11 can be positioned at inlet 16 for directing product into fryer 10. At least one internal conveyor 13 can carry product received from infeed conveyor 11 through oil receiving area 28 and direct the product towards outlet 18 and out of fryer 10. Product that exits fryer 10 through outlet 18 can be directed onto an outfeed conveyor 15 to transport the product to another location for further processing.

Oil receiving area 28 can comprise at least one reservoir (e.g., a kettle or vat) for holding oil for frying a food article. A first baffle member 22 and a second baffle member 24 can be positioned within fryer 10 to define a substantially enclosed frying chamber 30. To restrict air baffle members 22, 24 can form a wall or partial wall between frying chamber 30 and areas outside of frying chamber 30 on both the inlet and outlet sides of frying chamber 30. In the exemplary embodiment, baffle members 22, 24 extend downward from hood 14 and generally restrict air from entering frying chamber 30 through inlet 16 and outlet 18. In particular, baffles 22, 24 can extend from the top of the hood and across the width of the interior of the hood. Baffles 22, 24 can extend downward towards the surface of oil 26 in the oil receiving area and openings or gaps 32, 34 can be formed between the surface of oil 26 and the lower portion of baffles 22, 24. Preferably, the lower portions of baffles 22, 24 approach, but do not contact, the surface of oil 26, to allow product to move under baffles 22, 24 when entering and exiting frying chamber 30.

Because flying chamber 30 is substantially enclosed it provides a highly efficient flying system. First, because baffles 22, 24 greatly reduce air infiltration into frying chamber 30, the amount of energy required to heat the oil in the first place can be reduced. In particular, less energy is required to maintain the temperature of the oil within the flying chamber 30 since the surrounding air is primarily high temperature steam. Second, high temperature steam 36, which would otherwise be waste heat, can be directed to an steam recapture port 38 for reuse in this or another energy consuming process. For example, the recaptured heat (steam) can be directed to a heat exchanger to recover the thermal energy of the steam, or it can be directly transferred to another source to heat that source as desired.

To further improve the efficiency of flyer 10, a first exhaust port 40 can be provided at the inlet side of the first baffle 22 and a second exhaust port 42 can be provided at the outlet side of the second baffle 24. First and second exhaust ports 40, 42 draw outside air 44 (and potentially a small amount of steam from the oil in the portion of the reservoir outside the baffles and/or from gaps 32, 34) upwards through first and second exhaust ports 40, 42. Thus, outside air is directed away from gaps 32, 34 and thereby restricting outside air from entering frying chamber 30 between the surface of oil 26 and the lower portion of baffles 22, 24. First and second exhaust ports 40, 42 can include a fan member configured to draw air towards them and away from gaps 32, 34, creating a negative pressure area outside of the frying chamber and adjacent to the baffle members 22, 24 (e.g., upstream of the first baffle 22 and downstream of the second baffle 24). Thus, all outside air is being pulled away from bottom of baffles 22, 24 and very little, if any, air is being pulled under baffles 22, 24 and into frying chamber 30.

As noted above, because oil 26 is present outside of baffles 22, 24 and some steam from inside frying chamber 30 can potentially escape from frying chamber 30 through gaps 32, 34, exhaust ports 40, 42 can also draw a small amount of warm air or steam from the oil 26 and, to some extent, out of fryer chamber 30. Accordingly, cooler air from outside frying chamber 30 is generally prevented from entering frying chamber 30, which improves the efficiency of frying chamber 30 and increases the amount of reusable steam generated inside frying chamber 30 for recapture and reuse by steam recapture port 38.

Referring again to FIG. 1, steam recapture port 38 and exhaust ports 40, 42 are shown as generally rectangular openings in hood 14. However, it should be understood that other shapes and configurations (e.g., round, oval, etc.) of the steam recapture and exhaust ports can be provided.

Figure 3:
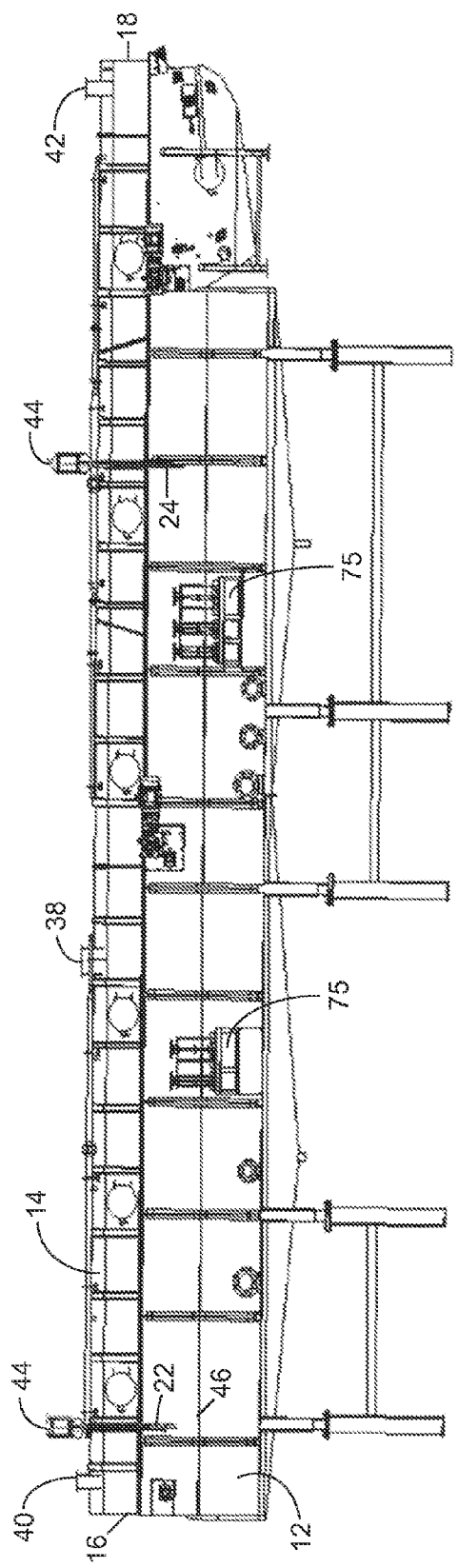
FIG. 3 is a side view of the fryer shown in FIG. 1.

FIG. 3 is another view of fryer 10, showing baffles 22, 24 positioned between exhaust ports 40, 42. Each baffle 22, 24 can include a baffle adjustment member 44. Baffle adjustment members 44 can operate to move a respective baffle up or down to adjust the height of the baffle relative to a conveyor and/or a surface of the oil in fryer 10.

Figure 4:
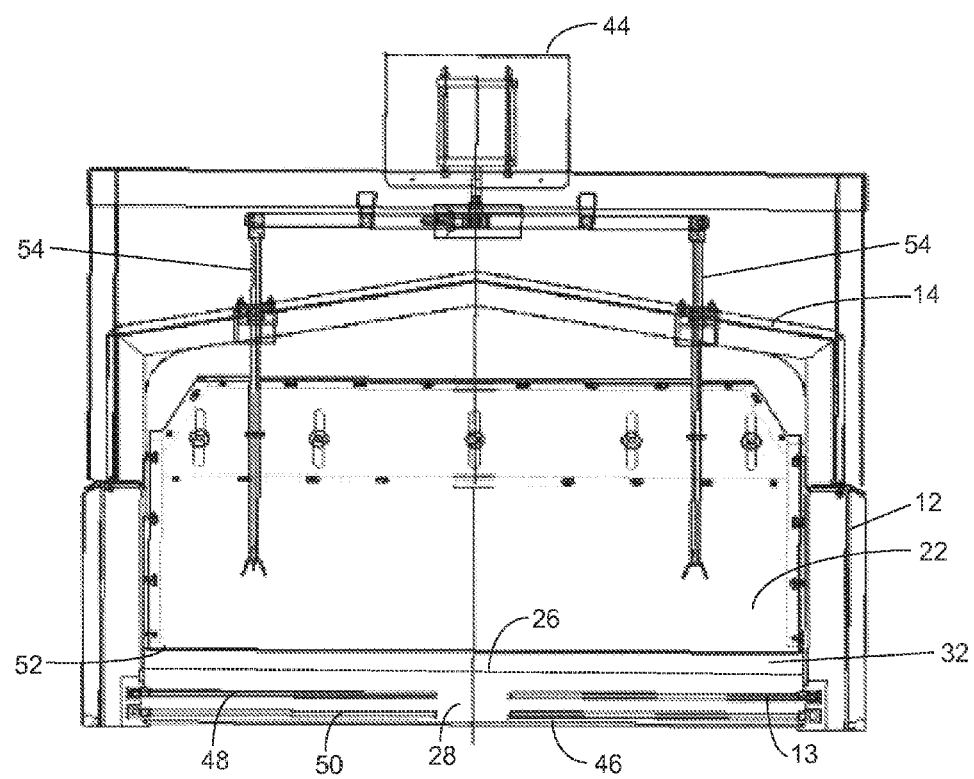
FIG. 4 is a cross-sectional view of a portion of the flyer shown in FIG. 1, illustrating a baffle member configured to substantially enclose a side of a frying chamber.

FIG. 4 illustrates baffle adjustment member 44 and the operation of baffle 22 in more detail. Although FIG. 4 illustrates only baffle 22, it should be understood that both baffles 22, 24 can function in the same general manner. As shown in FIG. 4, oil receiving area 28 can have a lower surface 46 that is covered with oil 26. Conveyor 13 comprises a top portion 48 and a bottom portion 50, both of which can be submerged in oil 26, at least within the primary frying area (e.g., frying chamber 30).

Preferably, as shown in FIG. 4, the sides and top of baffle 22 are generally flush with the side walls and top wall of hood 14 to restrict the flow of air therebetween. Lower surface 52 of baffle 22 and the top surface of the oil 26 can have a gap 32 formed therebetween to allow product to pass under lower surface 52 as described above. A height of gap 32 can be adjusted by vertically moving baffle 22 up or down and/or by adjusting the height of the oil 26 in oil receiving area 28. For example, if larger product (or greater amounts of individual product) will be delivered into and out of flying chamber 30 under baffles 22, 24, it may be necessary to raise the baffles to increase the distance between the oil surface and the lower portions of the baffles. Thus, when increasing the amount or size of product feed into flying chamber 30, raising baffles relative to the conveyor surface and/or oil surface can allow the product to more easily pass under the baffles. Of course, by increasing the height of a baffle, such as baffle 22, the efficiency of flying chamber 30 (and the available stream recapture energy) may be somewhat reduced. Preferably, the distance between the oil surface and the lower portion of baffle 22 is about 0.5-10 inches, and more preferably about 1-5 inches.

Referring again to FIG. 4, baffle adjustment member 44 can be coupled to baffle 22 via one or more arms 54. Arms 54 can extend through an opening in hood 14. Thus, by adjusting baffle adjustment member 44, arms 54 can move up or downward to adjust the position of baffle 22, and more particularly, to adjust the position of the lower portion 52 of baffle relative to the surface of the oil 26.

Figure 5:
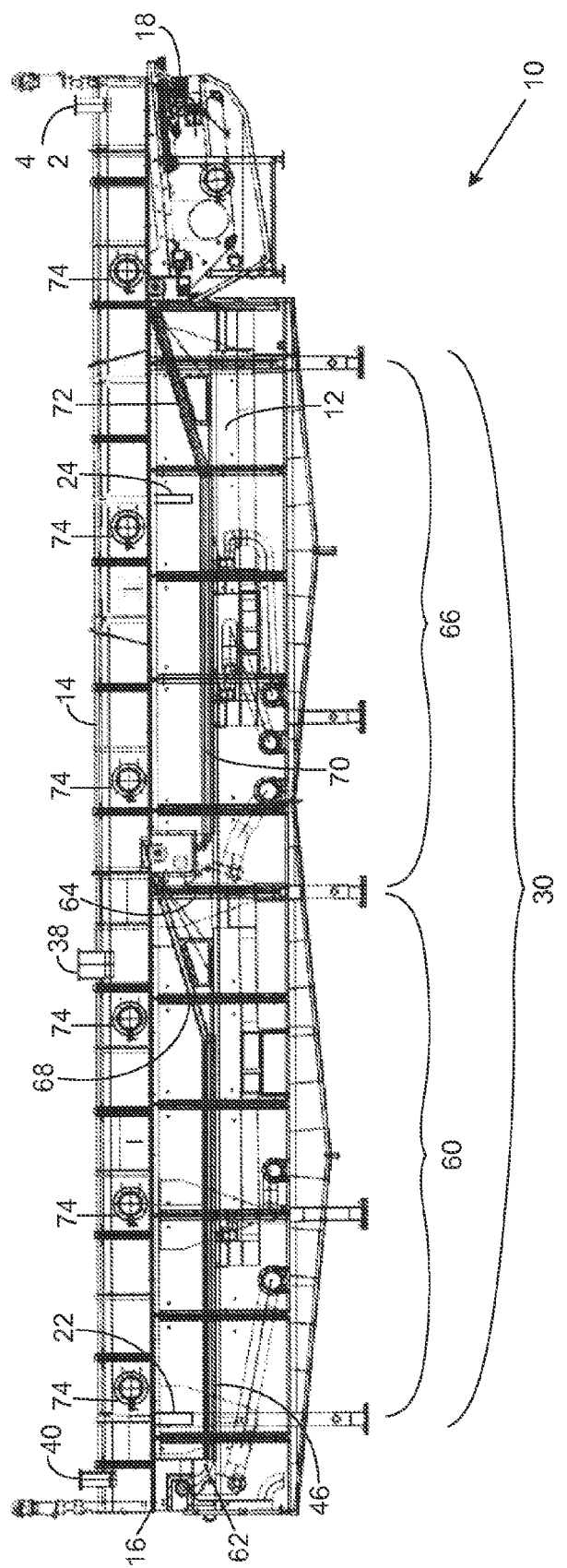
FIG. 5 is a partial cross-sectional view of a novel flyer, illustrating a substantially enclosed frying chamber that comprises a plurality of frying stages.

FIG. 5 illustrates another embodiment of a fryer 10. FIG. 5 is similar to FIG. 1; however, FIG. 5 illustrates a plurality of frying sections within frying chamber 30. A first frying section 60 comprises a first conveyor 62 that delivers product into frying chamber 30. Frying chamber 30 is divided by a wall member 64, which separates first frying section 60 from a second frying section 66. Thus, wall member 64 separates the oil receiving area into two separate reservoirs.

First conveyor 62 can have an inclined section 68 that extends out of the first reservoir of oil in section 60 to deliver product from first frying section 60 into second frying section 66. First and second flying sections can be generally the same in terms of size and operation; alternatively, they can differ from one another.

In one embodiment, first frying section 60 can be a batter frying section and second frying section 66 can comprise a main frying section. Batter frying section can have a product depth, oil depth, flying temperature, and product delivery rate conducive to allowing a batter or other coating on a food article to "set" on the food article before leaving first frying section 60. To facilitate batter setting, for example, the average product bed depth can be relatively small, such as less than about 2 inches, or even less than about 1 inch. In addition, the residence time of product in the first frying section can be significantly shorter than that of the second frying section. For example, the first flying section can have a residence time of about half or one-third of that of the second frying section. Preferably, the residence time of the first frying section is less than about 30 seconds and, more preferably between about 10 and 25 seconds. In one embodiment, the residence time of product in the first frying section is about 15 seconds.

As noted above, second flying section 66 can comprise a main or primary flying section. Product can exit first frying section 60 (e.g., a batter frying section) by moving up the inclined section 68 of first conveyor 62. Inclined section 68 directs product over wall member 64 and into second frying section 66. Thus, product is dropped off the end of first conveyor 62 into an oil-receiving area of second frying section 66 that is separate from an oil-receiving area in first frying section 60. Once product is delivered into the second frying section 66, it can be transported downstream on a second conveyor 70. Since second frying section 66 is separated from first frying section 60 by wall member 64, it can provide different frying conditions (e.g., oil, flow rates, oil levels/bed depth, temperatures) than those provided in first frying section 66.

As noted above, second frying section 66 can have a longer residence time for product (e.g., slower conveyor speeds). In addition, second frying section 66 can have, if desired, different frying temperatures, different frying oils, larger product bed depths, and various other operational and physical differences from first frying section 60. Thus, in one embodiment, for example, a bed depth can be greater than about 2 inches and, more preferably greater than 3 inches, and more preferably about 4 inches. The residence time of the product in the second frying section can be about 60-120 seconds, and more preferably between about 70 and 90 seconds.

Second conveyor 70 can be generally similar to first conveyor 62. Product can be advanced downstream along second conveyor 70 and out of the second frying section 66 via an inclined section 72 of second conveyor 70. Baffle 24 can be positioned upstream from inclined section 72 to generally enclose the frying chamber 30 and restrict the entrance of outside air into frying chamber 30 from the downstream side (e.g., outlet 18). After passing under baffle 24, product can be raised out of the oil by movement up inclined section 72, which can then deliver the product onto an outfeed conveyor for removal from the fryer for further processing.

In an exemplary embodiment, the fryer can have a substantially constant width. That is the width of the first conveyor and the width of the second conveyor (and the width of their respective oil containing areas or kettles) can be substantially the same. The width of the fryer is preferably greater than about 50 inches and more preferably greater than about 60 inches. In one embodiment, the width of the fryer is about 72 inches. The length of the first and second frying sections can be substantially the same. Thus, the residence time can be adjusted by providing different conveyor speeds in the first and second frying sections.

As described above, hood 14 is preferably substantially fixed to base 12 to achieve a generally air-tight seal within fryer 10. Since hood 14 is generally non-removable, a plurality of ports 74 can be provided to allow viewing and/or physical access into the fryer 10. Ports 74 can have generally transparent windows to allow such viewing access and/or can open to allow physical access into the interior of fryer 10.

Referring again to FIGS. 1 and 3, separate valve banks 75 can be provided for controlling the oil in the first and second frying sections 60, 66. Valve banks 75 can be configured to add and remove oil from the oil-receiving areas of first and second frying sections 60, 66. In one embodiment, oil can be drained from the oil-receiving areas, filtered and returned to the oil-receiving areas. In another embodiment, valve banks 75 can control the draining of oil from the oil-receiving areas and, once drained, the oil-receiving areas and the inside of the fryer can be cleaned using a clean-in-place system.

Figure 6:
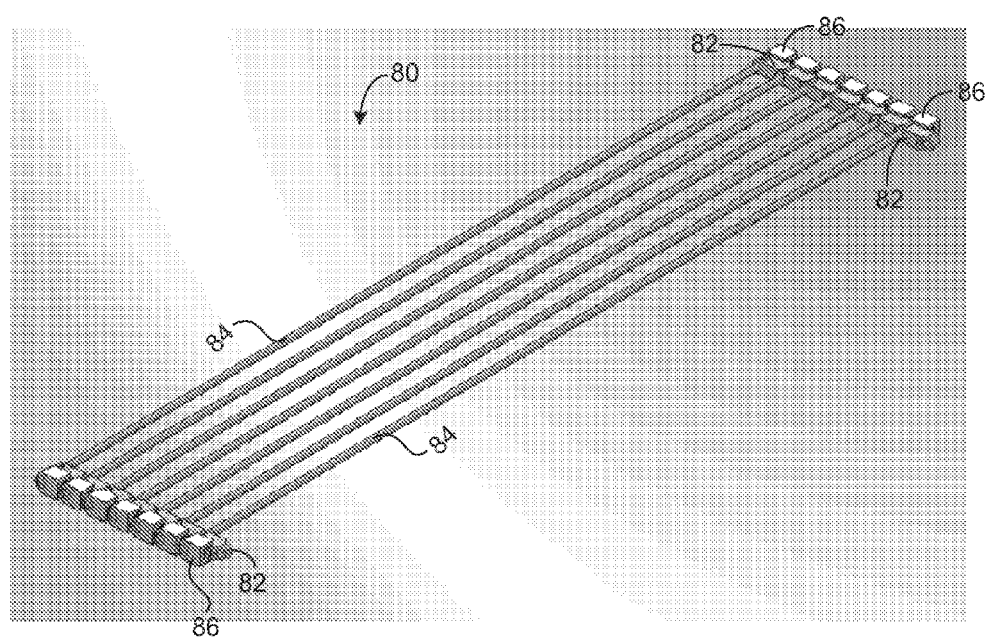
FIG. 6 is a perspective view of a portion of a novel conveyor system.

Referring to FIGS. 6-9, a novel chain design and belt containment mechanism is provided. FIG. 6 illustrates a conveyor system 80 that comprises a plurality of side links 82, a plurality of rod members 84, and a plurality of slidable members 86. Rod members 84 extend across the width of the conveyor and are configured to support a product carrying member, such as a wire cloth (not shown) or other surface that can extend across rod members and transport product from one location to another.

Figure 7:
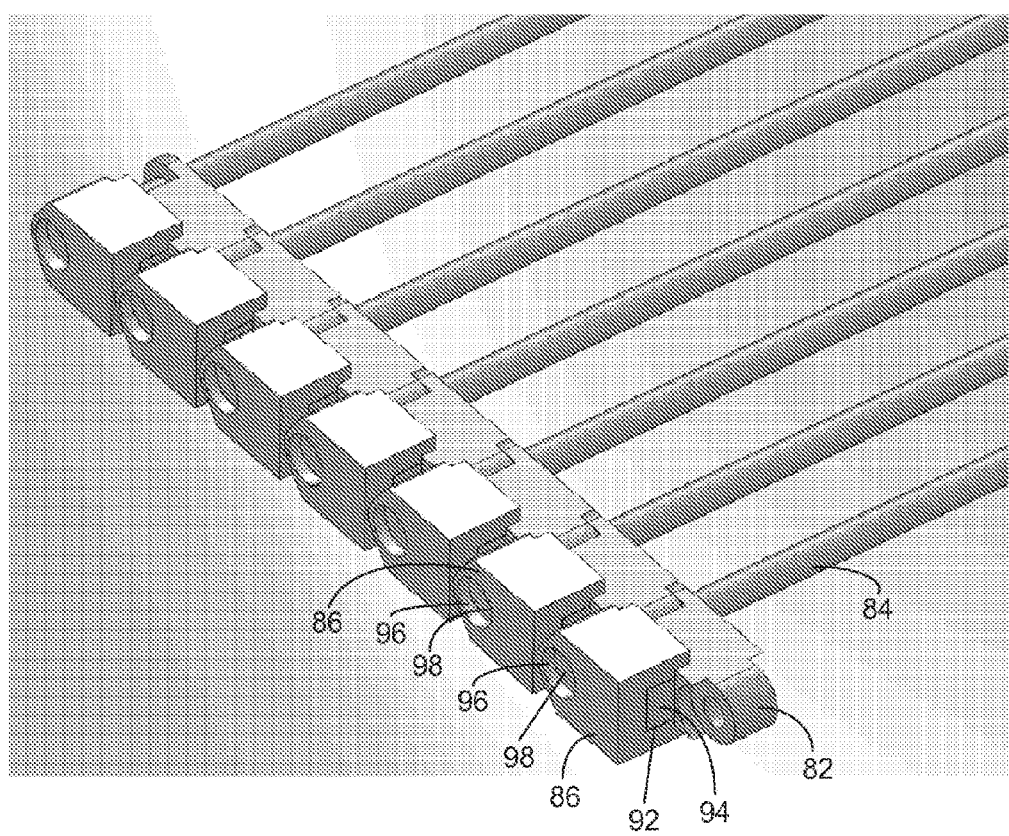
FIG. 7 is a close-up perspective view of a portion of the novel conveyor system shown in FIG. 6.
Figure 8:
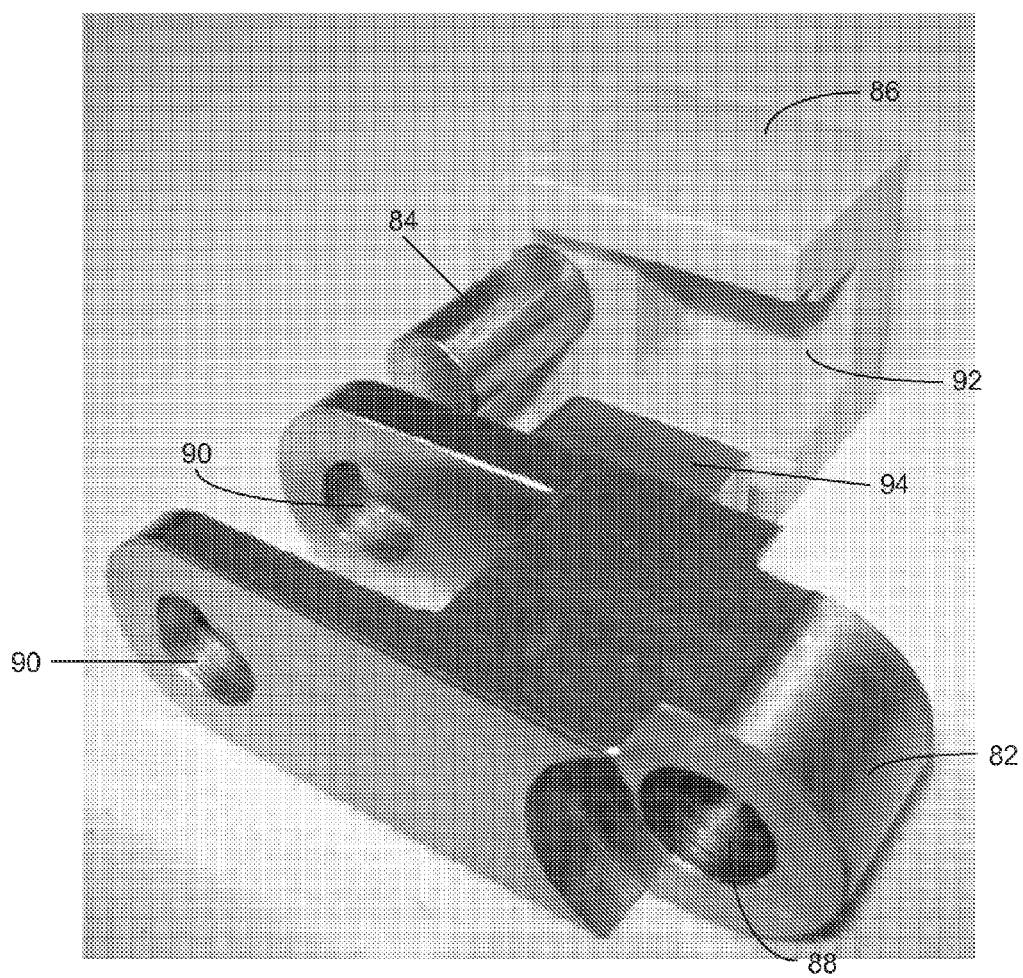
FIG. 8 is a close-up perspective view of a portion of the novel conveyor system shown in FIG. 6.

As shown in more detail in FIGS. 7 and 8, a plurality of side links 82 can be interconnected by rod members 84. As shown in FIG. 8, each side link 82 can have a first rod receiving area 88 and a second rod receiving area 90. First rod receiving area 88 can be defined by an opening in a generally cylindrical member and second rod receiving area 90 can be defined by two spaced-apart openings. Thus, the generally cylindrical member of a first rod receiving area 88 of a first side link can be received between the two spaced-apart openings of a second rod receiving area 90 of a second side link. A rod member 84 can be extended through both the first rod receiving area 88 of a first side link and the second rod receiving area 90 of a second side link, thereby coupling the first and second side links together. For clarity, only a portion of rod member 84 is shown in FIG. 8.

Side links 82 are preferably formed of steel or other similar materials to provide sufficient strength to support the rod members and loads carried by the rod members (e.g., product carrying member and the product carried thereon during operation). To reduce friction and wear relative to a surface of the fryer which is also preferably formed of a metal (e.g., steel), side links 82 can be received at least partially into a slidable member 86.

Figure 9:
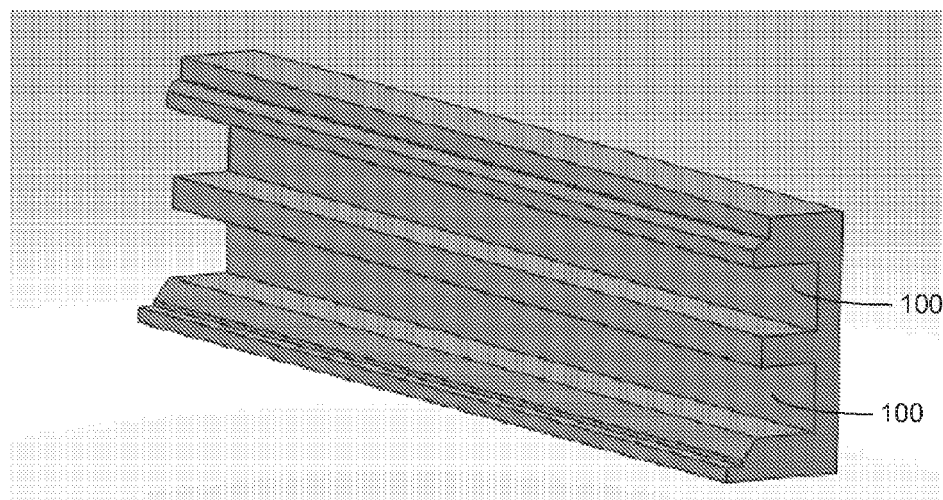
FIG. 9 is a perspective view of a pair of channels configured to receive the conveyor system shown in FIG. 6.
Figure 10:
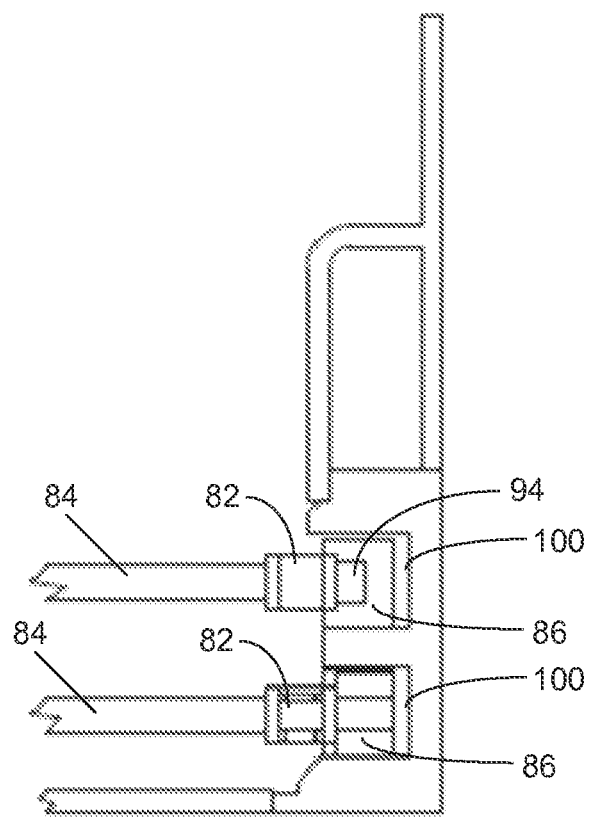
FIG. 10 is a cross-sectional view illustrating a portion of the channels and the conveyor system shown in FIG. 6.

Slidable member 86 can be configured to be received within and maintain contact with a slotted section of the fryer that defines the direction and path of travel of the conveyor member (FIGS. 9 and 10). Accordingly, slidable member 86 is preferably formed of a material that is generally slidable relative to the slotted section. In addition, to reduce the frequency or need to replace the slidable member, slidable member 86 is preferably formed of a wear-resistant material that can cooperate with the material of the slotted section. If the slotted section is steel or a similar metal, the wear material can be, for example, a polyether ether ketone (PEEK) material.

Thus, to reduce friction between the slotted section and the side link 82, side links 82 preferably do not contact the slotted section of the fryer. Accordingly, a slidable member is preferably positioned between each side link 82 and the slotted sections to restrict and/or reduce contact between the slotted section and the side links. In the exemplary embodiment, each slidable member 86 has an inside face and an outside face. The outside face faces the slotted sections and the inside face faces the inside of the fryer. Each slidable member comprises a recessed section 92 on its inside face, and the recessed section is sized to receive a portion 94 of side link member 82 that extends towards the slotted section. As shown in FIG. 7, the outside face (e.g., back side) of each slidable member 86 comprises a recessed hole 96 for receiving a retainer 98 that couples a rod member 84 to the slidable member 86. Thus, retainers 98 can extend into the recessed hole 96 to couple the rod member to the slidable member without contacting or extending out toward the slotted section.

FIG. 9 illustrates a pair of slotted sections or channels 100 in which the slidable members 86 move. Because the conveyor is an endless conveyor (i.e., a continuous loop), a top channel and a bottom channel are provided for receiving slidable members 86. In many conventional systems, side guides or rails that extend from a side wall of the fryer create surfaces on which oil can pool and crumbs can accumulate. Slotted sections 100 are preferably recessed so that the area above and below the slotted sections are generally flush with the walls of the hood (see, e.g., FIGS. 4 and 10). By providing slidable members 86 that ride in slotted sections 100 within the recessed channels, crumb collecting surfaces such as side guides or rails along the side of the belt can be eliminated.

As shown in FIG. 10, slidable members 86 preferably fit relatively tightly inside the top and bottom slotted sections 100 so that there are no surfaces (other than the belt itself) that extend from the side wall of the fryer base. This configuration substantially prevents or restricts crumbs and other debris from accumulating along the side of the conveyor, which can degrade the oil and result in a potential fire hazard.

Instead of using slidable members as wear-resistant elements (e.g., PEEK members), a stationary surface, such as along the entire the slotted section itself, can be formed of wear-resistant material. However, it can be difficult and time consuming to replace a wear-resistant material that extends the length of the slotted section. Accordingly, a plurality of separate slidable members 86 are preferably formed of wear-resistant material and coupled to side links as shown in FIGS. 7 and 8. Thus, slidable members 86 can be easily inspected and, if desired, individually replaced without removing other portions of the conveyor (e.g., belt, rod members, etc.). Moreover, because this design can incorporate structurally strong side links (e.g., steel side links), it is capable of supporting a heavy duty belt and rod members.

Not only does the elimination of side guides and rails along the side of the conveyor belt reduce crumb collection and other accumulation of debris, it makes it easier to clean the inside of the fryer. As discussed in detail above, the fryer hood is preferably secured to the base in a generally non-removable manner. This structure, together with the fryer's design, facilitates cleaning of the inside of the fryer using clean in place technology. Thus, a plurality of a hoses and sprayer nozzles can be positioned within the inside of the fryer. By eliminating accumulation and collection areas, such as are present behind conventional side guides and rails, the hoses and sprayer nozzles can clean the inside of the fryer more effectively.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A conveyor-based frying apparatus, the apparatus comprising:
   a base having a reservoir for receiving oil for frying a food product, the base defining a top channel slot and a bottom channel slot forming a continuous track for a conveyor;
   a hood coupled to the base, the hood and the base defining an upstream opening that is open to the environment outside of the conveyor-based frying apparatus and a downstream opening that is open to the environment outside of the conveyor-based frying apparatus;
   an upstream inlet chamber arranged between the upstream opening and a first baffle member, wherein the upstream inlet chamber has an inlet exhaust port in communication with at least one fan, wherein the at least one fan and the inlet exhaust port cause a negative pressure in the upstream inlet chamber to draw air through the upstream opening and from under the first baffle, wherein the air is exhausted from the inlet exhaust port into the environment outside of the conveyor-based frying apparatus;
   a downstream outlet chamber arranged between the downstream opening and a second baffle member, wherein the downstream outlet chamber has an outlet exhaust port in communication with at least one fan, wherein the at least one fan and the outlet exhaust port cause a negative pressure in the downstream outlet chamber to draw air through the downstream opening and from under the second baffle, wherein the air is exhausted from the outlet exhaust port into the environment outside of the conveyor-based frying apparatus;
   a fry chamber arranged between the first baffle member and the second baffle member, wherein the fry chamber has a heat recapture port, wherein the heat recapture port transfers heat to at least one member of a group consisting of: the conveyor-based frying apparatus, to a heat exchanger, and to another source beside the conveyor-based frying apparatus;
   at least one conveyor for moving product from the upstream opening, into the upstream inlet chamber, under the first baffle, into the fry chamber, under the second baffle, into the downstream outlet chamber, and out of the downstream opening, wherein the at least one conveyor includes a plurality of side links coupled together via rod members extending across the width of the at least one conveyor; and
   a plurality of slidable members extending into the top channel slot and the bottom channel slot in the base, wherein each slidable member is configured to receive at least a portion of one side link to retain the conveyor in the top channel slot and the bottom channel slot in the base and restrict contact of the side links with the base.

2. The conveyor-based frying apparatus of claim 1, wherein the fry chamber includes a first frying section and a second frying section, wherein the first frying section is divided from the second frying section by an upwardly extending wall.

3. The conveyor-based frying apparatus of claim 2, wherein the at least one conveyor includes a first and a second conveyor, wherein the first conveyor is positioned within the first frying section and includes an inclined portion for delivering product over the upwardly extending wall into the second frying section, wherein the second conveyor is positioned within the second frying section.

4. The conveyor-based frying apparatus of claim 3, wherein the first frying section has different frying conditions than the second frying section.

5. The conveyor-based frying apparatus of claim 1, wherein the first baffle member includes a first baffle adjustment member for raising and lowering the first baffle member in a vertical direction, wherein the first baffle adjustment member is coupled to the first baffle member via at least one arm extending through the hood.

6. The conveyor-based frying apparatus of claim 5, wherein the second baffle member includes a second baffle adjustment member for raising and lowering the second baffle member in a vertical direction, wherein the second baffle adjustment member is coupled to the second baffle member via at least one arm extending through the hood.

7. The conveyor-based frying apparatus of claim 1, wherein the hood is fixedly coupled to the base.

8. The conveyor-based frying apparatus of claim 1, wherein each of the slidable members comprises a polyether ether ketone to wear against the top channel slot and the bottom channel slot in the base.

9. The conveyor-based frying apparatus of claim 1, wherein the slidable members are generally the same width as a depth of the top and bottom channels.

10. The conveyor-based frying apparatus of claim 1, wherein each slidable member comprises a recessed portion on an inside face for receiving a portion of the side link that extends outward towards the top and bottom channels, and each slidable member comprises a recessed portion on an outside face to receive a retainer for securing the rod member to the slidable member.

11. The conveyor-based frying apparatus of claim 1, wherein each slide link comprises a first rod receiving section and a second rod receiving section, wherein the first rod receiving section comprises a generally cylindrical member that has an opening extending therethrough, wherein the second rod receiving section comprises a pair of spaced apart openings.

12. A conveyor-based frying apparatus, the apparatus comprising:
   a base having a reservoir;
   a hood coupled to the base, the hood and the base defining an upstream opening that is open to the environment outside of the conveyor-based frying apparatus and a downstream opening that is open to the environment outside of the conveyor-based frying apparatus;

an upstream inlet chamber arranged between the upstream opening and a first baffle member, wherein the upstream inlet chamber has an inlet exhaust port in communication with at least one fan, wherein the at least one fan and the inlet exhaust port cause a negative pressure in the upstream inlet chamber to draw air through the upstream opening and from under the first baffle, wherein the air is exhausted from the inlet exhaust port;

a downstream outlet chamber arranged between the downstream opening and a second baffle member, wherein the downstream outlet chamber has an outlet exhaust port in communication with the at least one fan, wherein the at least one fan and the outlet exhaust port cause a negative pressure in the downstream outlet chamber to draw air through the downstream opening and from under the second baffle, wherein the air is exhausted from the outlet exhaust port;

a fry chamber arranged between the first baffle member and the second baffle member, wherein the fry chamber has a heat recapture port, wherein the heat recapture port transfers heat to at least one member of a group consisting of: the conveyor-based frying apparatus, a heat exchanger, and another source beside the conveyor-based frying apparatus;

at least one conveyor for moving product from the upstream opening, into the upstream inlet chamber, under the first baffle, into the fry chamber, under the second baffle, into the downstream outlet chamber, and out of the downstream opening, wherein at least one of the first baffle member or second baffle member includes a baffle adjustment member for raising and lowering at least one of the first baffle member or second baffle member in a vertical direction, the baffle adjustment member coupled to at least one of the first baffle member or second baffle member via at least one arm extending through the hood.

13. The conveyor-based frying apparatus of claim 12, wherein the fry chamber includes a first frying section and a second frying section, wherein the first frying section is divided from the second frying section by an upwardly extending wall.

14. The conveyor-based frying apparatus of claim 13, wherein the at least one conveyor includes a first and a second conveyor, wherein the first conveyor is positioned within the first frying section and includes an inclined portion for delivering product over the upwardly extending wall into the second frying section, wherein the second conveyor is positioned within the second frying section.

15. The conveyor-based frying apparatus of claim 14, wherein the first frying section has different frying conditions than the second frying section.

16. The conveyor-based frying apparatus of claim 12, wherein the hood is fixedly coupled to the base.

17. A conveyor-based frying apparatus, the apparatus comprising:
a base having an oil reservoir;
a hood coupled to the base, the hood and the base defining an upstream opening that is open to the environment outside of the conveyor-based frying apparatus and a downstream opening that is open to the environment outside of the conveyor-based frying apparatus;
an upstream inlet chamber arranged between the upstream opening and a first baffle member, wherein the upstream inlet chamber has an inlet exhaust port in communication with at least one fan, wherein the at least one fan and the inlet exhaust port cause a negative pressure in the upstream inlet chamber to draw air through the upstream opening and from under the first baffle, wherein the air is exhausted from the inlet exhaust port into the environment outside of the conveyor-based frying apparatus;
a downstream outlet chamber arranged between the downstream opening and a second baffle member, wherein the downstream outlet chamber has an outlet exhaust port in communication with at least one fan, wherein the at least one fan and the outlet exhaust port cause a negative pressure in the downstream outlet chamber to draw air through the downstream opening and from under the second baffle, wherein the air is exhausted from the outlet exhaust port into the environment outside of the conveyor-based frying apparatus;
a fry chamber arranged between the first baffle member and the second baffle member; and
at least one conveyor for moving product from the upstream opening to the downstream opening, wherein at least one of the first baffle member or second baffle member includes a baffle adjustment member for raising and lowering at least one of the first baffle member or second baffle member in a vertical direction, the baffle adjustment member coupled to at least one of the first baffle member or second baffle member via at least one arm extending through the hood.

18. A conveyor-based frying apparatus, the apparatus comprising:
a base having a reservoir for receiving oil for frying a food product, the base defining a top channel slot and a bottom channel slot forming a continuous track for a conveyor;
a hood coupled to the base and including a wall, the hood and the base defining an upstream opening that is open to the environment outside of the conveyor-based frying apparatus and a downstream opening that is open to the environment outside of the conveyor-based frying apparatus;
a fry chamber arranged between the upstream opening and the downstream opening;
at least one conveyor for moving product from the upstream opening to the downstream opening, wherein the at least one conveyor includes a plurality of side links coupled together via rod members extending across the width of the at least one conveyor; and
a plurality of slidable members extending into the top channel slot and the bottom channel slot in the base, each slidable member configured to receive at least a portion of one side link to retain the conveyor in the top channel slot and the bottom channel slot in the base and restrict contact of the side links with the base, wherein the top channel slot and the bottom channel slot in the base are generally flush with the wall of the hood.

* * * * *